US011884086B2

(12) United States Patent
Ramesh et al.

(10) Patent No.: US 11,884,086 B2
(45) Date of Patent: Jan. 30, 2024

(54) SYSTEM AND METHOD FOR PRINTING COLOR IMAGES ON SUBSTRATES IN AN INKJET PRINTER

(71) Applicant: Xerox Corporation, Norwalk, CT (US)

(72) Inventors: Palghat S. Ramesh, Pittsford, NY (US); Jack T. LeStrange, Macedon, NY (US); Anthony S. Condello, Webster, NY (US); Joseph C. Sheflin, Macedon, NY (US); Peter Knausdorf, Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 110 days.

(21) Appl. No.: 17/648,731

(22) Filed: Jan. 24, 2022

(65) Prior Publication Data

US 2023/0234352 A1 Jul. 27, 2023

(51) Int. Cl.
*B41J 11/02* (2006.01)
*B41J 29/393* (2006.01)

(52) U.S. Cl.
CPC .............. *B41J 29/393* (2013.01); *B41J 11/02* (2013.01)

(58) Field of Classification Search
CPC . B41J 29/393; B41J 11/02; B41J 2/035; B41J 2/06; B41J 2/095; B41J 3/4076
See application file for complete search history.

(56) References Cited

U.S. PATENT DOCUMENTS

| | | | |
|---|---|---|---|
| 8,840,241 B2 | 9/2014 | Fletcher et al. | |
| 2004/0055536 A1 | 3/2004 | Kolar et al. | |
| 2006/0061625 A1* | 3/2006 | Konno | B41J 2/06 347/102 |
| 2011/0076734 A1 | 3/2011 | Zhou et al. | |
| 2012/0273352 A1 | 11/2012 | Blair et al. | |
| 2020/0039251 A1 | 2/2020 | Fromm et al. | |

FOREIGN PATENT DOCUMENTS

CN 110614848 A * 12/2019

* cited by examiner

*Primary Examiner* — Julian D Huffman
(74) *Attorney, Agent, or Firm* — Maginot Moore & Beck LLP

(57) ABSTRACT

A color inkjet printer includes an electrode that emits an electric field into a gap between a printhead and a media transport that carries media past the printhead. Image data generated by an optical sensor after an ink image is printed on the media is analyzed to measure at least one image quality metric. When the measured image quality metric is outside of a tolerance range, the voltage of a voltage source electrically connected to the electrode is adjusted to improve the wetting of the media type with the ink ejected by the printhead.

17 Claims, 12 Drawing Sheets

SYSTEM AND METHOD FOR PRINTING COLOR IMAGES ON SUBSTRATES IN AN INKJET PRINTER

TECHNICAL FIELD

This disclosure relates generally to devices that produce ink images on media, and more particularly, to the image quality of the images produced by such devices.

BACKGROUND

Inkjet imaging devices, also known as inkjet printers, eject liquid ink from printheads to form images on an image receiving surface. The printheads include a plurality of inkjets that are arranged in an array. Each inkjet has a thermal or piezoelectric actuator that is coupled to a printhead controller. The printhead controller generates firing signals that correspond to digital data content of images. The actuators in the printheads respond to the firing signals by expanding into an ink chamber to eject ink drops onto an image receiving member and form an ink image that corresponds to the digital image content used to generate the firing signals. The image receiving member can be a continuous web of media material or a series of media sheets.

Inkjet printers used for producing color images typically include multiple printhead assemblies. Each printhead assembly includes one or more printheads that typically eject a single color of ink. Usually, an inkjet color printer has four printhead assemblies that are positioned in a process direction with each printhead assembly ejecting a different color of ink. The four ink colors most frequently used are cyan, magenta, yellow, and black. The common nomenclature for such printers is CMYK color printers. Some CMYK printers have two printhead assemblies that eject each color of ink. The printhead assemblies that print the same color of ink are offset from each other by one-half of the distance between adjacent inkjets in the cross-process direction to double the pixels per inch density of a line of the color of ink ejected by the printheads in the two assemblies. As used in this document, the term "process direction" means the direction of movement of the media as they pass the printheads in the printer and the term "cross-process direction" means a direction that is perpendicular to the process direction in the plane of the media.

Many image quality problems in inkjet printing systems arise from interactions between the media and the ink or from ink to ink interactions. The surface energies of inks and media drive many of these interactions. On uncoated media, ink wets the media well, and results in robust drop spread and line spread performance. For coated media, however, the ink typically does not wet the media well and results in poor drop spread and line spread performance. To improve the ink/media interaction, media are specially treated with chemicals, such a precoat that is applied to the media prior to ejecting inks on the media. The application of the precoat material improves the wetting of the inks on the media, which in turn improves the adhesion of inks to the media. This adhesion of ink to media is sometimes referred to as "pinning."

Ink on ink interactions occur when ink drops are ejected onto previously ejected ink drops, especially when the previously ejected ink drops are a different color. The physics of the interactions of these differently colored inks are complex. Problems, such as inter-color bleed, occur when the capillary pressure inside one drop forces ink into a previously ejected drop of a different color of ink. Image quality (IQ) problems, such as overlay graininess, occur because unstable ink drops move around easily when ejected onto other ink drops since the drops do not wet the media sufficiently. Successfully controlling the wetting of inks on different media (uncoated, matte-coated, gloss-coated) and on other ink layers would be beneficial.

SUMMARY

A color inkjet printer is configured to produce color images on different types of media substrates with little or no overlay graininess. The color inkjet printer includes at least one printhead configured to eject liquid ink drops, a media transport configured to carry media past the at least one printhead in a process direction to receive the liquid ink drops ejected by the at least one printhead, a platen made of a high dielectric constant material, the platen being positioned opposite the media transport, at least one electrode, and at least one electrical voltage source operatively connected to the at least one electrode to emit an electric field into a gap between the at least one printhead and the media transport.

A method of operating a color inkjet printer produces color images on different types of media substrates with little or no overlay graininess. The method includes operating an optical sensor to generate image data of an ink image printed on a media substrate carried by a media transport past at least one printhead in the color inkjet printer, measuring at least one image quality parameter using the generated image data, comparing the measured at least one image quality parameter to a corresponding tolerance range for the at least one measured image quality parameter, and adjusting a voltage level of a voltage source operatively connected to at least one electrode that emits an electric field into a gap between the at least one printhead and the media transport when the at least one measured image quality parameter is outside the corresponding tolerance range.

An interdigitated electrode is used in a color inkjet printer to produce color images on different types of media substrates with little or no overlay graininess. The interdigitated electrode includes a platen of high dielectric constant material, and a plurality of electrodes embedded in the platen.

BRIEF DESCRIPTION OF THE DRAWINGS

The foregoing aspects and other features of a color inkjet printer and color inkjet printer operational method that produces color images on different types of media substrates with little or no overlay graininess are explained in the following description, taken in connection with the accompanying drawings.

DETAILED DESCRIPTION

Figure 1:
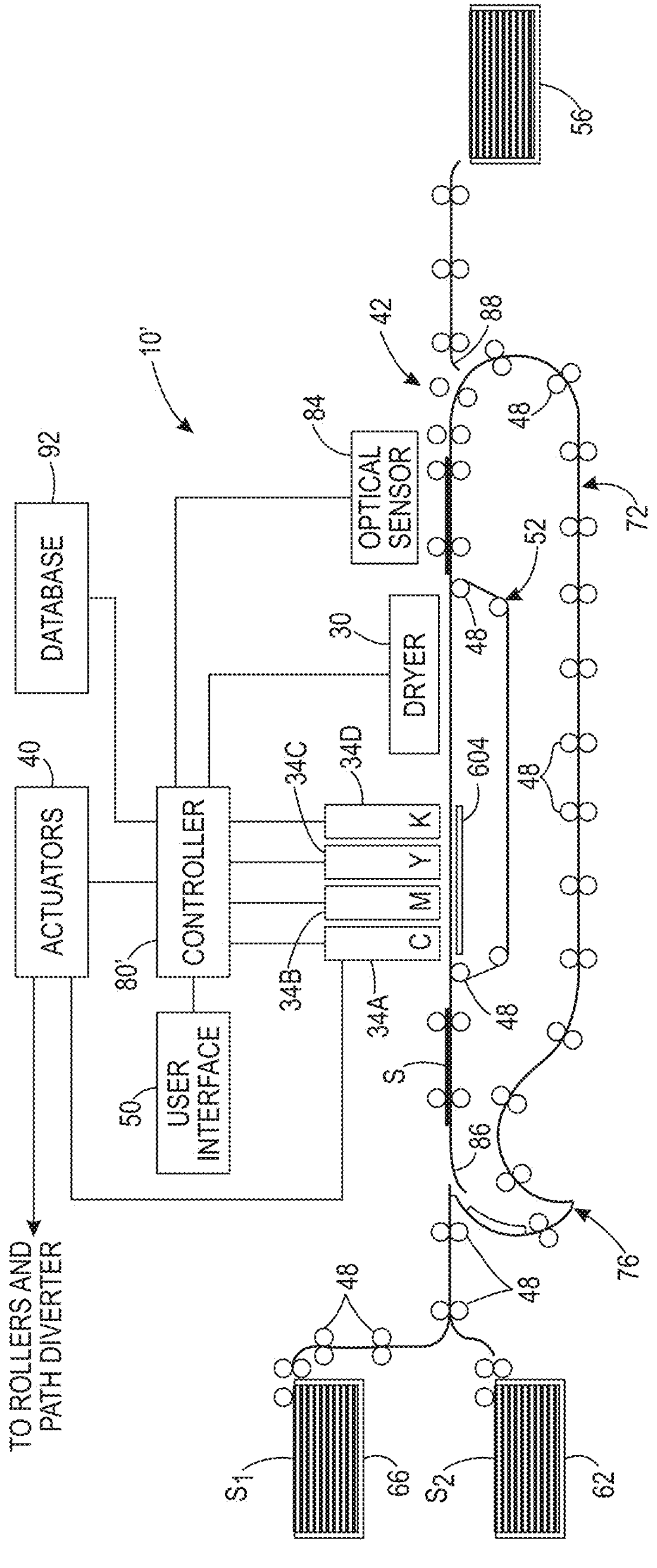
FIG. 1 is a schematic drawing of a color inkjet printer that produces color images on different types of media substrates with little or no overlay graininess.

For a general understanding of the environment for the printer, the printer operational method, and the interdigitated electrode used in such a printer that are disclosed herein as well as the details for the printer, the printer operational method, and electrode configuration, reference is made to the drawings. In the drawings, like reference numerals have been used throughout to designate like elements. As used herein, the word "printer" encompasses any apparatus that ejects ink drops onto different types of media substrates to form ink images.

Figure 11:
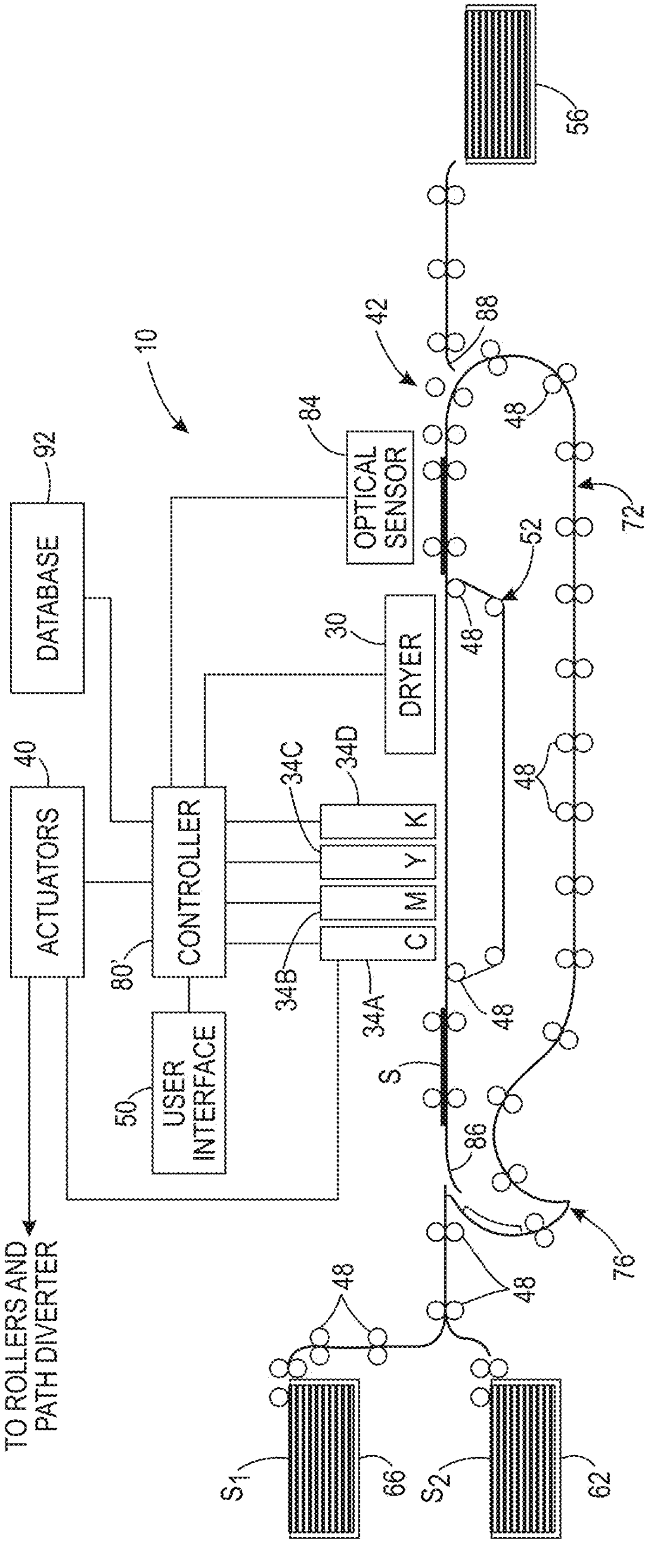
FIG. 11 PRIOR ART
FIG. 11 is a block diagram of a prior art high-speed color inkjet printer 10 that cannot produce color images on different types of media substrates with little or no overlay graininess.

FIG. 11 depicts a prior art high-speed color inkjet printer 10. As illustrated, the printer 10 is a printer that directly forms an ink image on a surface of a media sheet stripped from one of the supplies of media sheets $S_1$ or $S_2$ and the sheets S are moved through the printer 10 by the controller 80 operating one or more of the actuators 40 that are operatively connected to rollers or to at least one driving roller of conveyor 52 that comprise the media transport 42. In one embodiment, each printhead module has only one printhead that has a width that corresponds to a width of the widest media in the cross-process direction that can be printed by the printer. In other embodiments, the printhead modules have a plurality of printheads with each printhead having a width that is less than a width of the widest media in the cross-process direction that the printer can print. In these modules, the printheads are arranged in an array of staggered printheads that enables media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media.

Figure 12:
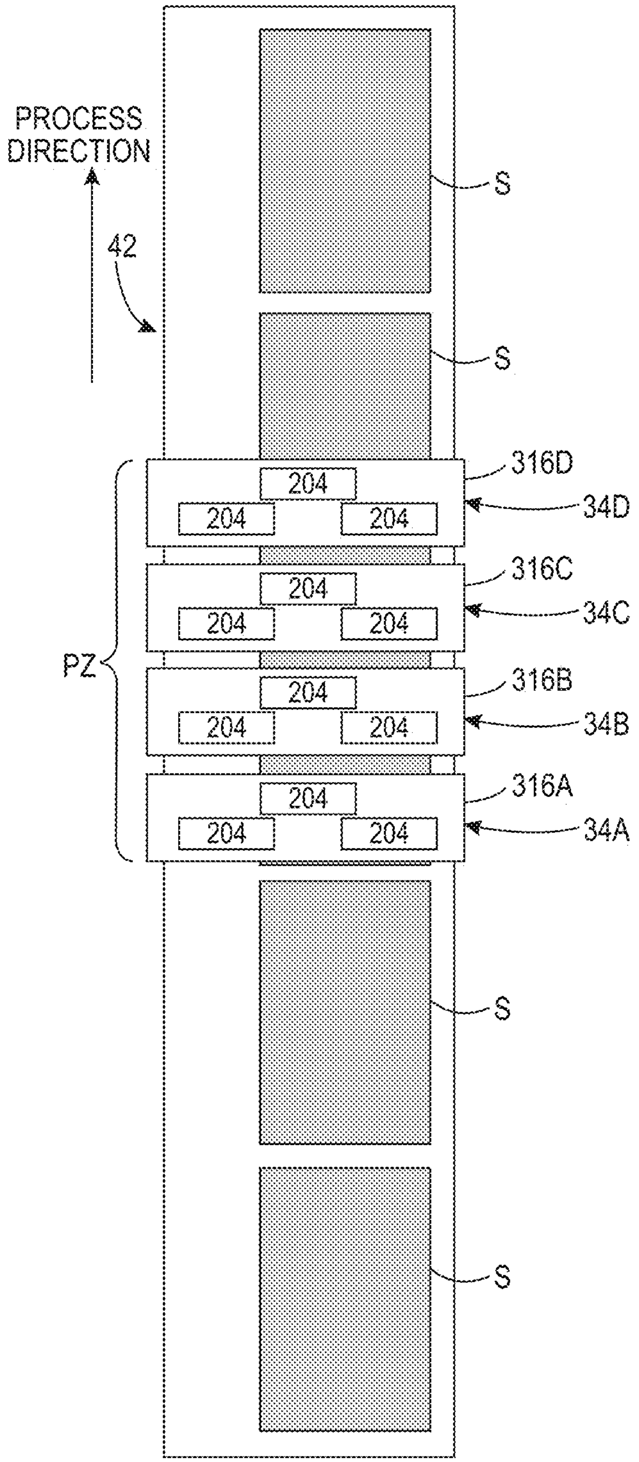
FIG. 12 PRIOR ART
FIG. 12 illustrates a print zone in the printer of FIG. 11.

The print zone PZ in the prior art printer of FIG. 11 is shown in FIG. 12. As used in this document, the term print zone means an area having a length in the process direction commensurate with the distance from the first inkjets that a sheet passes in the process direction to the last inkjets that a sheet passes in the process direction and a width that is the maximum distance between the most outboard inkjet and the most inboard inkjet on opposite sides of the print zone that are directly across from one another in the cross-process direction. Each printhead module 34A, 34B, 34C, and 34D shown in FIG. 12 has three printheads 204 mounted to a printhead carrier plate 316A, 316B, 316C, and 316D, respectively.

As shown in FIG. 11, the printed image passes under an image dryer 30 after the ink image is printed on a sheet S. The image dryer 30 can include an infrared heater, a heated air blower, air returns, or combinations of these components to heat the ink image and at least partially fix an image to the web. An infrared heater applies infrared heat to the printed image on the surface of the web to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

A duplex path 72 is provided to receive a sheet from the transport system 42 after a substrate has been printed and move it by the rotation of rollers in an opposite direction to the direction of movement past the printheads. At position 76 in the duplex path 72, the substrate can be turned over so it can merge into the job stream being carried by the media transport system 42. The controller 80 is configured to flip the sheet selectively. That is, the controller 80 can operate actuators to turn the sheet over so the reverse side of the sheet can be printed or it can operate actuators so the sheet is returned to the transport path without turning over the sheet so the printed side of the sheet can be printed again. Movement of pivoting member 88 provides access to the duplex path 72. Rotation of pivoting member 88 is controlled by controller 80 selectively operating an actuator 40 operatively connected to the pivoting member 88. When pivoting member 88 is rotated counterclockwise as shown in FIG. 11, a substrate from media transport 42 is diverted to the duplex path 72. Rotating the pivoting member 88 in the clockwise direction from the diverting position closes access to the duplex path 72 so substrates on the media transport continue moving to the receptacle 56. Another pivoting member 86 is positioned between position 76 in the duplex path 72 and the media transport 42. When controller 80 operates an actuator to rotate pivoting member 86 in the counterclockwise direction, a substrate from the duplex path 72 merges into the job stream on media transport 42. Rotating the pivoting member 86 in the clockwise direction closes the duplex path access to the media transport 42.

Figure 4:
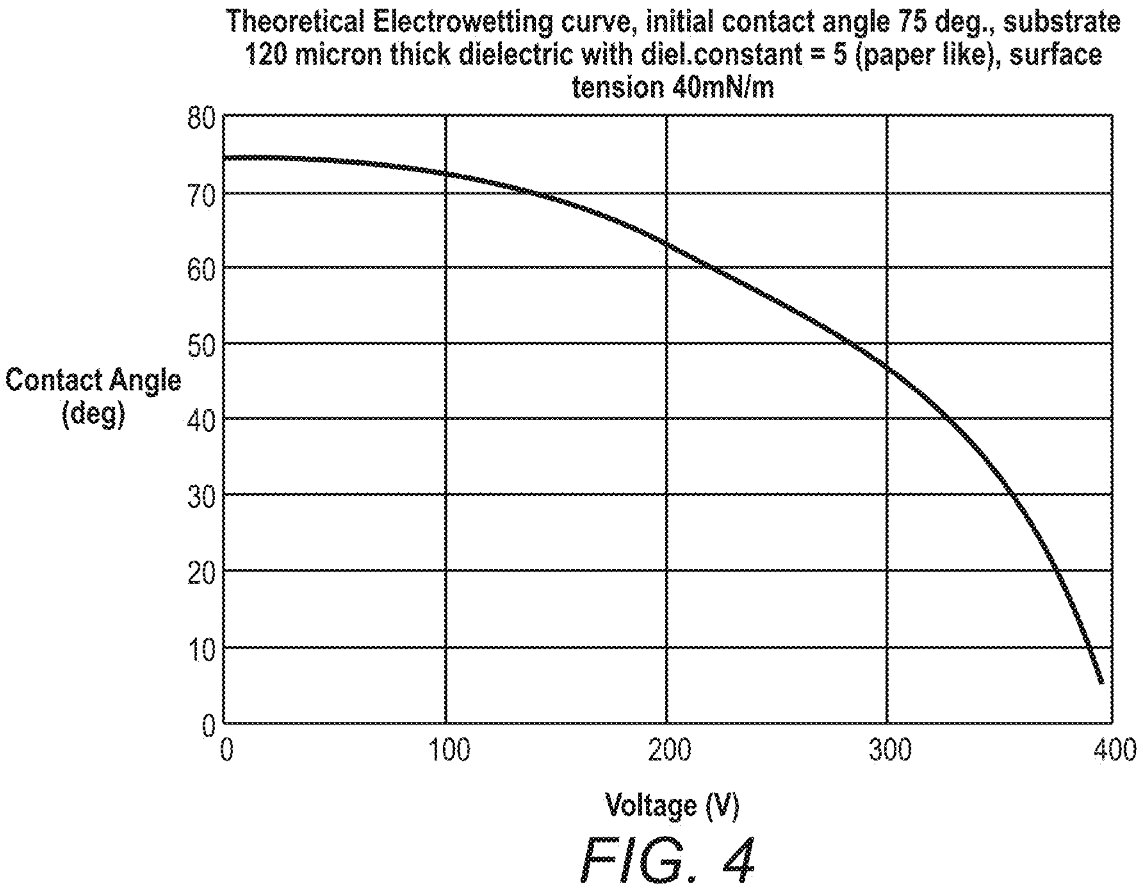
FIG. 4 is a graph showing the effect of voltage level on the initial contact angle of a drop ejected onto a dielectric layer.

As further shown in FIG. 11, the printed media sheets S not diverted to the duplex path 72 are carried by the media transport to the sheet receptacle 56 in which they are be collected. Before the printed sheets reach the receptacle 56, they pass by an optical sensor 84. The optical sensor 84 generates image data of the printed sheets and this image data is analyzed by the controller 80, which is configured to determine which inkjets, if any, that were operated to eject ink did in fact do so or if they did not eject an ink drop having an appropriate mass or that landed errantly on the sheet. Any inkjet operating in this manner is called an inoperative inkjet in this document. The controller can store data identifying the inoperative inkjets in a memory operatively connected to the controller. A user can operate the user interface 50 to obtain reports displayed on the interface that identify the number of inoperative inkjets and the printheads in which the inoperative inkjets are located. The optical sensor can be a digital camera, an array of LEDs and photodetectors, or other devices configured to generate digital image data of a passing surface. As already noted, the media transport also includes a duplex path that can turn a sheet over and return it to the transport prior to the printhead modules so the opposite side of the sheet can be printed. While FIG. 4 shows the printed sheets as being collected in the sheet receptacle, they can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operably connected to the components of the printhead modules 34A-34D (and thus the printheads), the actuators 40, and the dryer 30. The ESS or controller 80, for example, is a self-contained, dedicated mini-computer having a central processor unit (CPU) with electronic data storage, and a display or user interface (UI) 50. The ESS or controller 80, for example, includes a sensor input and control circuit as well as a pixel placement and control circuit. In addition, the CPU reads, captures, prepares, and manages the image data flow between image input sources, such as a scanning system or an online or a work station connection (not shown), and the printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, image content data for an image to be produced are sent to the controller 80 from either a scanning system or an online or work station connection for processing and generation of the printhead control signals output to the printhead modules 34A-34D. Along with the image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer. As used in this document, the term "print job parameters" means non-image content data for a print job and the term "image content data" means digital data that identifies an ink image to be printed on a media sheet.

Using like reference numbers to identify like components, FIG. 1 depicts a color inkjet printer 10' that produces ink images on different types of media with little or no overlay graininess. The printer 10' includes a controller 80' that has been configured to perform the process 1000 described below to produce color images on different types of media with little or no overlay graininess. The printer 10' controls the wetting of inks on different media substrates by applying electric fields to the ink drops, which are conductive, and an electrode plate positioned within the conveyor 52. The resulting electrostatic forces help overcome the surface energies that inhibit wetting on the media sheets to enable rapid wetting on even non-wetting surfaces. This electrostatic control of ink drop spread on media substrates is called electrowetting. Alternatively, the forces can be used to accelerate the ink spread on neutral or partially wetting substrates, producing ink drops that are much more stable than otherwise possible. The degree of wetting or ink spread is varied by adjusting the voltage producing the electric fields to ensure optimal spread across different types of media substrates, including coated and uncoated substrates, and a range of media thicknesses. The spread can be tuned using empirically determined values for voltages corresponding to different media or a feedback system can measure an IQ parameter of an ink image on media using an optical sensor and adjust the voltage supplied to the electrodes to increase or decrease the ink drop spread or intercolor bleed. Two embodiments are disclosed that leverage electrowetting in an inkjet printing system. The first embodiment produces electrostatic fields with interdigitated electrode arrays positioned underneath the belt of the conveyor 52 opposite the printheads. The second embodiment uses electrodes positioned between the printheads to produce the electric fields that control the wetting of the media carried by the conveyor 52.

Figure 2:
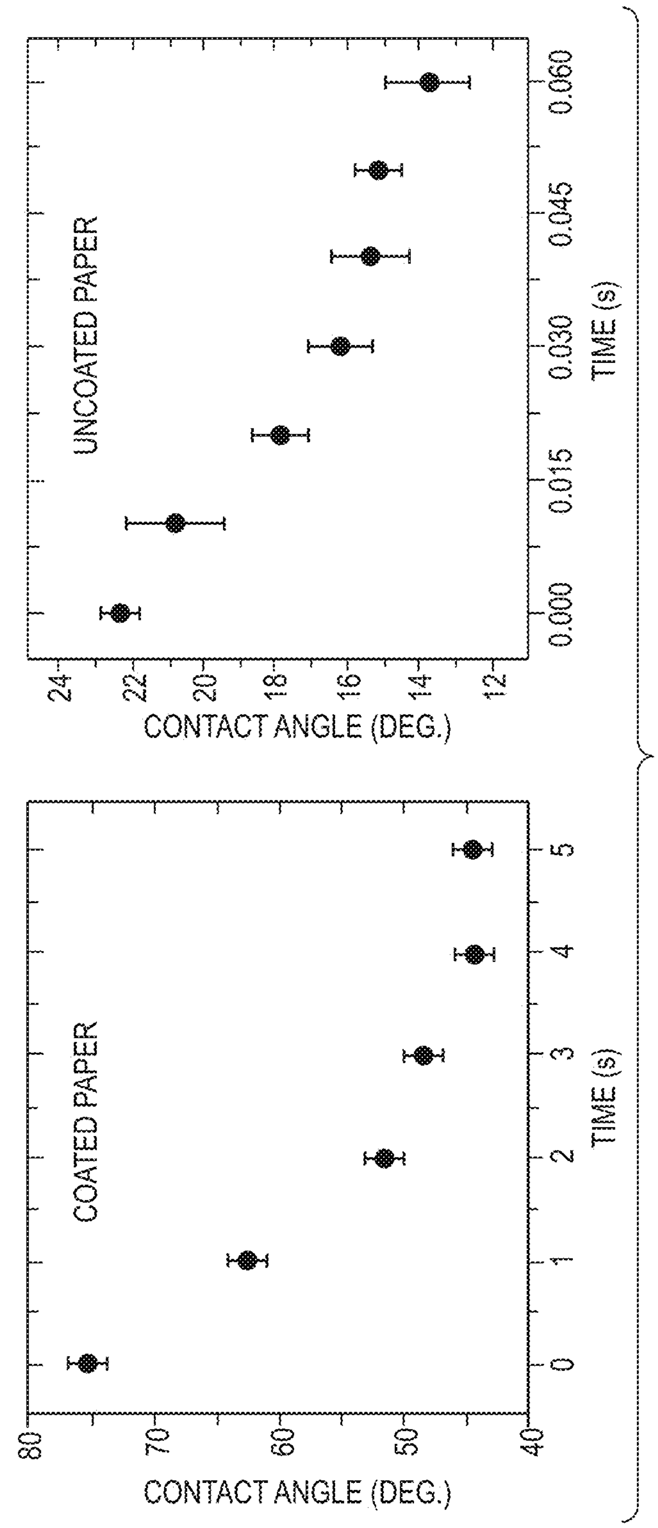
FIG. 2 depicts two graphs showing the difference between the wetting of coated and uncoated paper with water.

As noted previously, the surface energies of inks and media substrates significantly affect image quality. As shown in FIG. 2, contact angle measurements of water drops change differently with time on coated and uncoated paper substrates. As shown in the figure, water wets uncoatedpaper more quickly since the initial contact angle of 22° is small and it decreases by about 50% within 60 milliseconds. By contrast, the coated papers are more non-wetting since the initial contact angle of 75° is significantly higher than the initial contact angle on the uncoated paper and it decreases more slowly since a decrease of about 50% in contact angle requires about 5 seconds. Typical aqueous ink formulations are 60-70% water, and although surfactants can be added to increase the wetting factor for these inks on coated paper, short-term wetting of inks on coated media in high speed printing is unlikely to be inadequate. The typical time between different colors of ink being ejected onto a media substrate is about 0.19 second for 80 kHz printing. Thus, aqueous ink drops on coated paper are likely to stay beaded up, that is, non-wetting and unstable, when another color is ejected onto the media substrate.

Figure 3A:
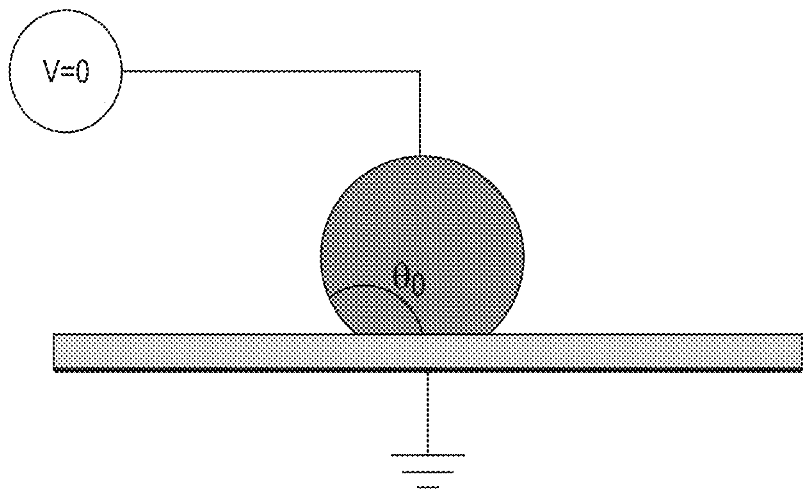
FIG. 3A and FIG. 3B illustrate the effect of an electric field on the wetting of a dielectric substrate.
Figure 3B:
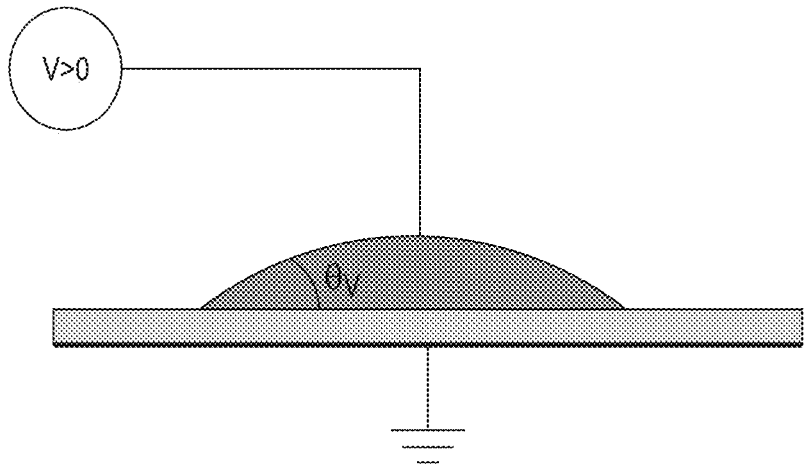
Figure 5:
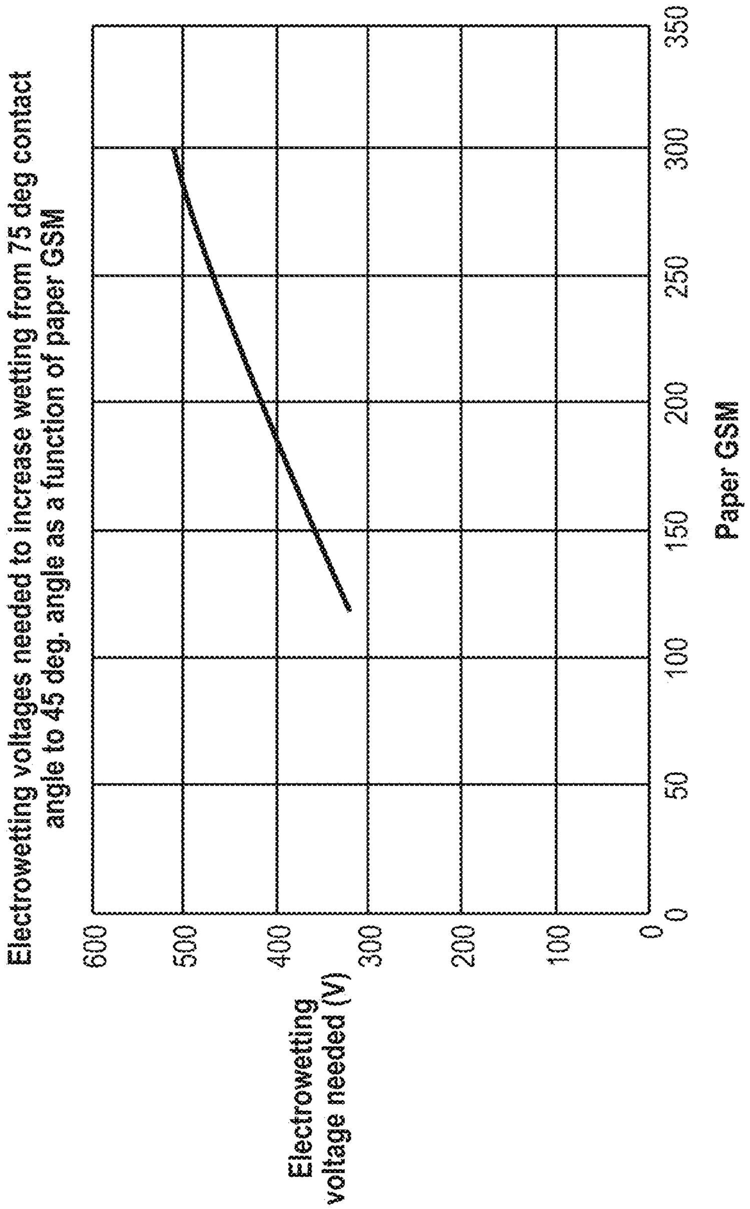
FIG. 5 is a graph showing the voltage level required to change the initial contact angle from 75° to 45° as a function of paper mass.

FIG. 3A and FIG. 3B show the effect of an electrostatic voltage on the wetting of an electrically grounded hydrophobic dielectric material surface with a drop ejected toward the surface. The drop shown in FIG. 3A, to which no voltage is applied, has a high contact angle, while the drop shown in FIG. 3B, to which a positive voltage has been applied, has a lower contact angle. This effect can be described with reference to the following equation:

$$\cos\theta_v = \cos\theta_0 + \tfrac{1}{2}(\varepsilon_0\varepsilon/\gamma l_{lv} d)V^2$$

Where $\theta_0$ is the static contact angle in the absence of an electric field, ε is the dielectric constant and d is the thickness of the dielectric layer, $\gamma_{lv}$ is the surface tension and ε0 is the permittivity of free space. FIG. 4 shows a theoretical electrowetting curve for water on coated paper as a function of voltage based on this equation. This figures shows that voltages in the range of about 250V to about 350V are needed to achieve contact angles in the range of 40-60 degrees for most normal papers. Higher voltages are required for papers having a higher mass as shown in FIG. 5. The mass measurement unit GSM means grams per square meter.

Figure 6:
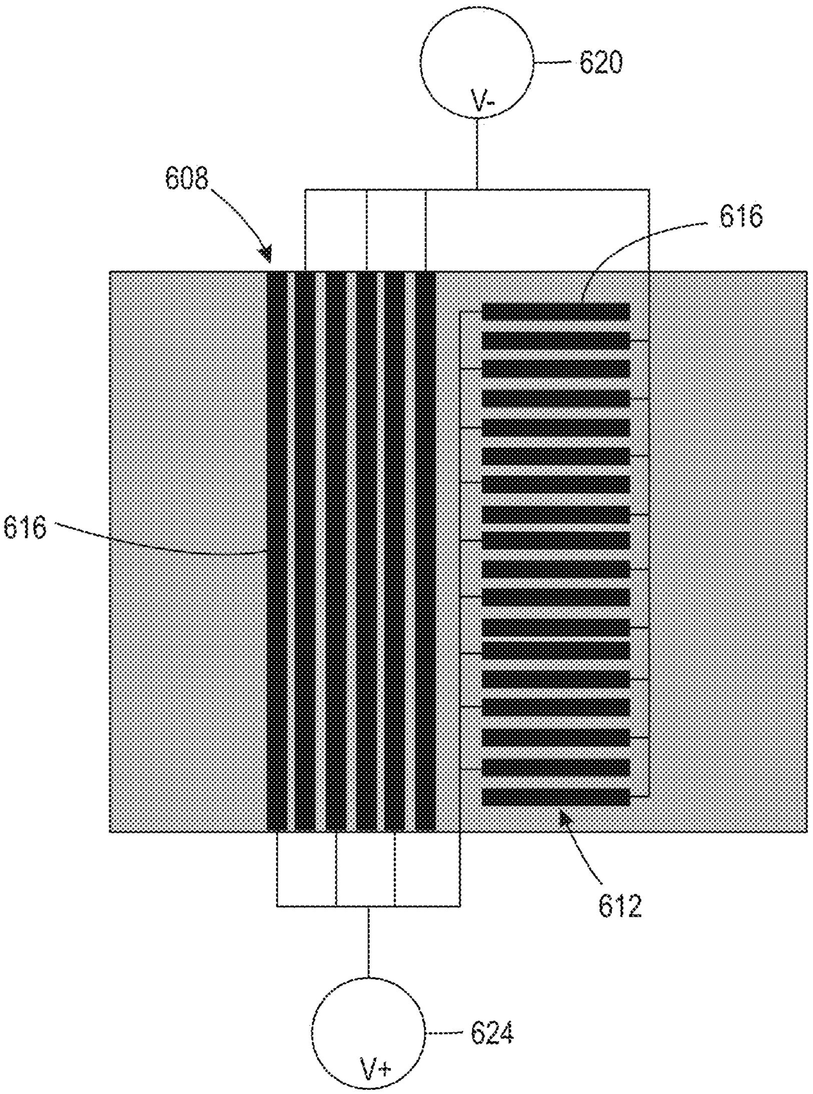
FIG. 6 depicts a platen of a high dielectric constant material embedded with interdigitated electrodes in the process and cross-process directions.

In one embodiment of the printer 10' shown in FIG. 1, electrodes are embedded in a high dielectric constant material that is positioned below the belt of the conveyor 52 and the media carried by the belt at a location opposite the printheads as shown in FIG. 1. A platen of high dielectric constant material 604 embedded with electrodes arranged in an interdigitated manner is shown in FIG. 6. The high dielectric constant material has a dielectric constant of 10 or greater and a dielectric breakdown strength of 20V/micron or greater. Such materials include but are not limited to silicon nitride, titanium dioxide, strontium titanate, barium strontium titanate, and barium titanate. Each electrode 616 is a strip of electrically conductive material, such as copper, having a first end and a second end. The electrodes in the group 608 of electrodes extend from one side of the platen to the opposite side of the platen. The electrodes in the group 612 extend a distance that corresponds to a length of a printhead assembly in the process direction. When the platen 604 is positioned within the conveyor 52, it is oriented so the group 608 is oriented in the cross-process direction of the media transport and the group of electrodes 612 is oriented in the process direction. Every other electrode 616 within the group 608 can be configured with a common electrical node for connection to positive voltage source 624, while the remaining electrodes 616 within group 608 can be configured with a common electrical node for connection to negative voltage source 620. Similarly, every other electrode 616 within the group 612 can be configured with a common electrical node for connection to positive voltage source 624, while the remaining electrodes 616 within group 612 can be configured with a common electrical node for connection to negative voltage source 620. Thus, when the electrodes of the two groups are connected to their respective voltage sources, the electrodes alternate in a positive/negative arrangement. As used in this document, the term "interdigitated" means a plurality of electrodes embedded in a high dielectric material and less than all of the electrodes are configured for connection to a first common voltage source and the remaining electrodes are configured for connection to a second common voltage source having an electrical polarity that is opposite the polarity of the first common voltage source so the electrodes can produce electric fields that extend a short distance above the media and the field lines reach from the positive electrodes to the neighboring negative electrodes. As used in this document, the word "embedded" means mounted onto a surface of a material or held within the volume of the material. As used in this document, the term "electrode" means an electrically conductive member. The spacing between the electrodes 616 is small compared to the gap between the printheads and the media so the electric fields produced by the electrodes penetrate the media and reach into the gap between the media and the printheads without reaching the nozzle plates of the printheads. These constraints keep the printhead nozzles plates out of the electric fields so the plates do not interfere with the drop generation process since electric fields at the nozzle plates have been known to produce ink drop satellites and nozzle plate contamination.

The dimensions of the electrodes are related to the size of the ink drops ejected by the printheads and the resolution of the printheads. For printheads having a resolution of 1200 dpi that eject ink drops having volumes in the about 3 to about 6 picoliters, the spacing between the drops is about 21 microns. In such a printer, the planar member electrodes have a width in the range of about 25 to about 50 microns that are spaced from one another by a distance of about 25 to about 50 microns.

Additionally, the belt of the conveyor 52 is semiconductive with its conductivity tuned for proper electric field generation between the electrodes in the gap between the printheads and the belt. The optimum value of conductivity is dependent on the spacing between the electrodes, as described more fully below, and the speed of the belt. This conductivity can be estimated by setting the charge relaxation time constant of the belt to be of the same order as the transit time of the belt between the electrodes according the equation:

$$\frac{K\varepsilon_0}{\gamma} \sim \frac{s}{U}.$$

In the equation above, K is the dielectric constant of the belt, $\gamma$ is the conductivity of the belt, $e_0$ is the permittivity of free space, s is the spacing between electrodes and U is the velocity of the belt in the process direction. The equation can be rearranged to give:

$$\gamma \sim \frac{K\varepsilon_0 U}{s}.$$

In one embodiment, these variable have the values, K=3, U=lm/s, s=100 microns, $e_0$ is a fundamental constant=$8.854\times10^{-12}$ Coulomb/V-m, which gives a value for conductivity of $8.854\times10^{-6}$ $(\text{ohm-m})^{-1}$. In general, the conductivity in this embodiment is in a range of about $10^{-5}$ to about $10^{-7}$ $(\text{ohm-m})^{-1}$. The belt conductivity is achieved by the amount of conductive additives mixed with polymer matrix forming the belt at the time of belt manufacture.

Figure 7:
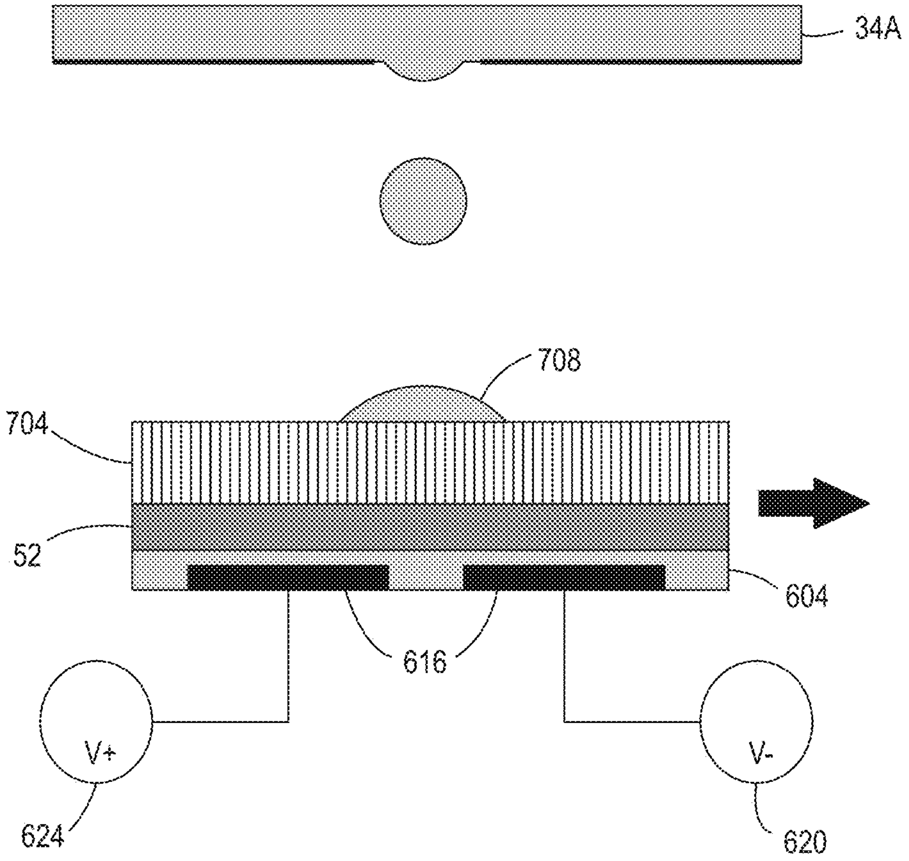
FIG. 7 is a side view of a portion of the print zone of the printer of FIG. 1 showing the interdigitated electrodes beneath the belt of the conveyor that carries media past the printhead assemblies.

A side view of a portion of the print zone beneath the printhead assembly 34A is shown in FIG. 7. A printhead of the assembly 34A ejects ink drops 708 toward the media 704 being carried by the belt of conveyor 52 over the platen of the interdigitated electrode 604. The electrodes 616 are connected to one of the electrical voltage sources 620 and 624 in an alternating manner as described above. The electric fields generated by the electrodes reduce the initial contact angle of the ink drops on the media 704 to improve the wetting of the ink on the media. The polarity of the electrostatic potential that an ink drop encounters does not matter since the drop experiences a downward electrostatic force in either case that forces the fluid in the ink drop to flow laterally. As the drops traverse the gap between the printhead and the media, they are generally unaffected by the electrostatic field and they only experience the varying electrostatic fields and forces due to the geometry of the electrodes in the microseconds before impact with the media; however, the net effect is an integral of all the electrostatic forces and they produce uniform spread or wetting in the direction perpendicular to the electrodes. The electrodes are grouped and oriented as discussed above with regard to groups 608 and 612 to spread the drops in both the process and cross-process directions.

Figure 8:
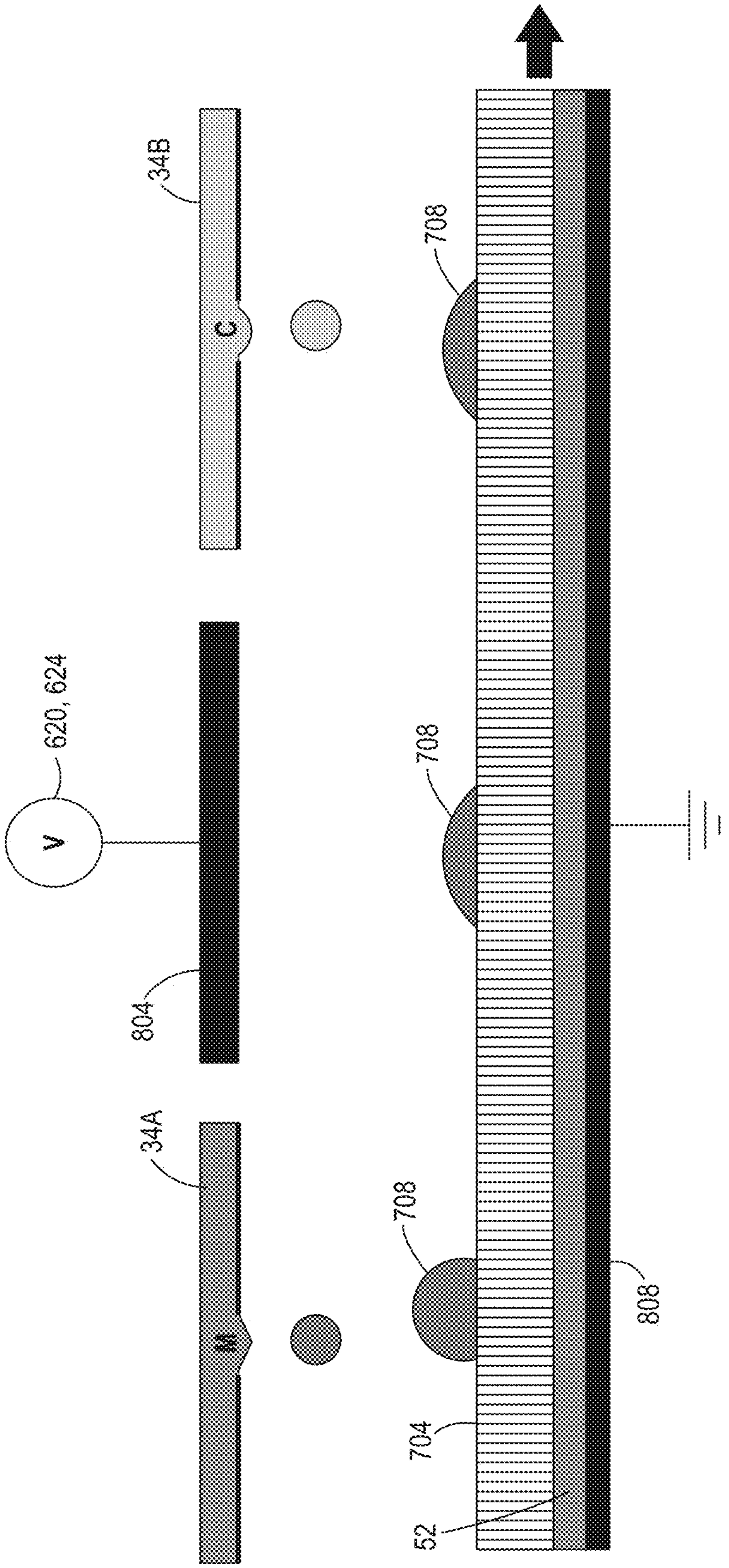
FIG. 8 is an alternative embodiment of an electrode that emits an electric field to improve the wetting characteristics of an ink on a type of media.

Another embodiment of electric field generators that can be used in printer 10' is shown in FIG. 8. In this embodiment, an electrode 804 is positioned between printhead assemblies 34A and 34B and located above the media transport 52 and below the printheads in the printhead assemblies 34A and 34B. The electrode 804 is electrically connected to one of the voltage sources 620 and 624 to emit an electric field toward a surface of the media transport 52 facing the printheads so the electric field produced by the electrode is emitted toward the media being carried by the media transport. When a print zone includes a plurality of printhead assemblies, an electrode is positioned between successive printhead assemblies in the process direction. The last electrode in the process direction is positioned between printhead assembly 34C and 34D. A platen 808 of high dielectric constant material is positioned below the belt of the conveyor 52 and is electrically connected to earth ground. The electrodes 804 can be a planar as shown in FIG. 8 so the electrode is longer in the process direction than it is tall in a direction perpendicular to the surface of the conveyor 52 or they can be shaped to achieve particular electric field shapes. In one embodiment, the electrode 804 is a linear array of pins that is electrically connected to the voltage source. Such a linear array can be implemented with a pin scorotron located above the media path. The pin scorotron is biased to a voltage level below the air breakdown threshold voltage, which is a known value. The electrodes 804 are electrically connected to one of the voltage sources to generate electric fields between successive printhead assemblies in the process direction and these electric fields reduce the initial contact angle of the ink drops ejected from the printheads in the printhead assemblies as they impact the media substrates carried by the conveyor 52. As used in this document, the term "scorotron" means any device configured to ionize air in the vicinity of the device when the device is charged. In another embodiment, each electrode positioned between the printheads is a blade, which means a planar member that is wider in the process direction than it is tall in a direction perpendicular to the surface of the conveyor and the blade has saw teeth pointing toward the surface of the conveyor 52. This blade is electrically connected to a voltage source to generate electric fields that alter the shape of the ink drops on the media carried by the conveyor. In the embodiments formed with planar member electrodes, each planar member is made of an electrically conductive material, which can be a metal, a semiconductive material, or the like.

Figure 9:
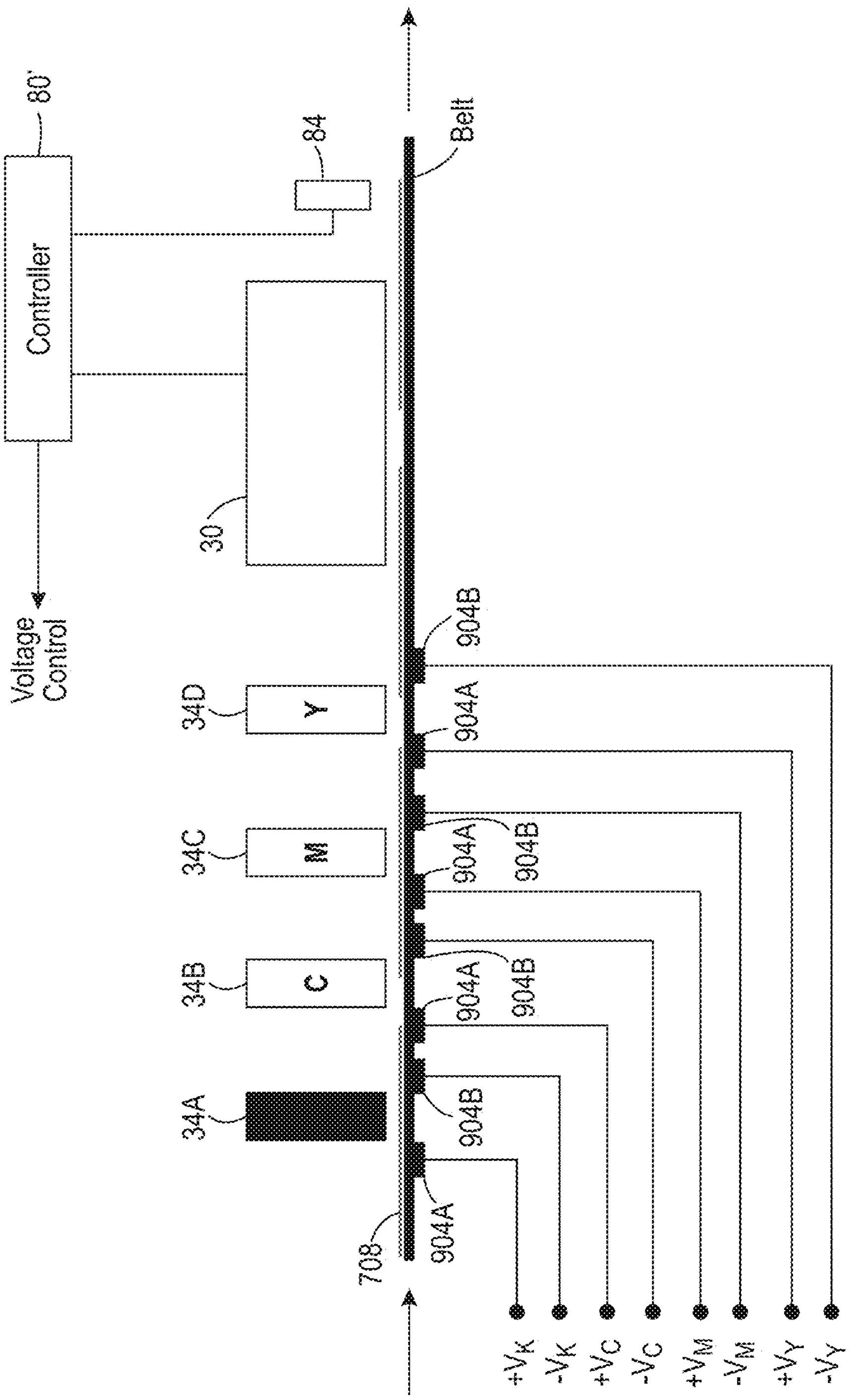
FIG. 9 is block diagram of a closed loop system for controlling the voltages used to operate the electrodes that emit an electric field to improve wetting characteristics of an ink on a type of media.

A variation of the second embodiment is shown in FIG. 9. In this embodiment, a pair of electrodes 904A and 904B is associated with each printhead assembly and the two electrodes of each pair are positioned on opposite sides of the associated printhead assembly in the process direction. Each electrode 904A is electrically connected to an independent positive voltage source and each electrode 904B is electrically connected to a independent negative voltage source. The controller 80' generates voltage control signals to control the positive and negative voltage sources independently of one another. A closed loop control system that the controller 80' uses to regulate the voltage sources electrically connected to the electrodes as shown in FIG. 6, FIG. 7, FIG. 8, and FIG. 9 is now discussed with reference to FIG. 9.

In the embodiments described above, the degree of media wetting is controlled with the voltage connected to the electrodes. The voltages can be set with empirically determined voltages for the type of media being printed, such as coated or uncoated, media weights, or combinations thereof. Alternatively, a closed loop system can be used in which an IQ metric, such as ink drop spread or inter-color bleed, is measured using an optical sensor, such as sensor 84, and the voltage level connected to an electrode is adjusted to increase or decrease the electric field produced by the electrode. The change in the electric field affects the IQ metric. Such a closed loop system is shown in FIG. 9 and the process for operating the system is shown in FIG. 10.

The closed loop system 900 includes the controller 80' that is operatively connected to the optical sensor 84 to receive image data of an ink image printed on media 708. The ink image can be a test pattern that is printed before a print job commences. In this embodiment, the media 708 is the same type of media that is to be printed in the upcoming print job and the test pattern is configured to enable the controller 80' to measure the IQ metric using image data of the test pattern from the optical sensor 84. In one embodiment, the IQ metric can be one or both of ink drop spread of different colors on the media type and inter-color bleed between different colors. As used in this document, the term "ink drop spread" means a measurement of the area of spread for an ink drop after it impacts a ink receiving surface and the term "inter-color bleed" means a measurement of the blending of two ink drops of different ink colors. The controller 80' is configured to measure the IQ metric using image data generated by the optical sensor 84 and determine whether the initial contact angles of the differently colored inks need a lesser or greater initial contact angle. The controller 80' is operatively connected to each voltage source connected to the electrodes 904A and 904B for each printhead assembly and it adjusts the voltage level of the voltage sources $+V_K$, $-V_K$, $+V_C$, $-V_C$, $+V_M$, $-V_M$, $+V_Y$, and $-V_Y$ connected to the electrodes 904A and 904B for each printhead assembly associated with the electrode pair. Likewise, the controller 80' uses the measured IQ metrics to independently regulate the voltage sources connected to the electrodes interposed between the printhead assemblies as shown in FIG. 8 and, similarly, to regulate the positive and negative voltage sources electrically connected to the electrodes as shown in FIG. 6 and FIG. 7.

Figure 10:
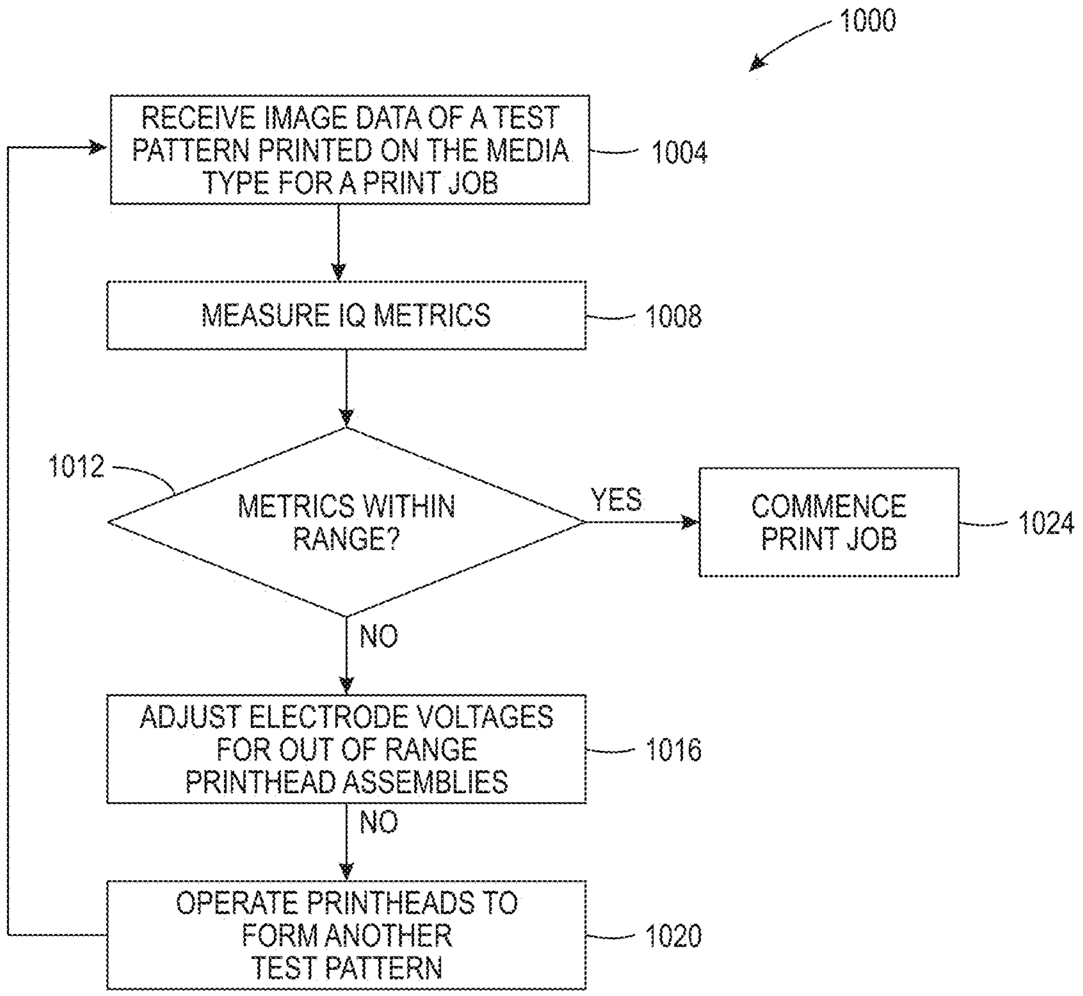
FIG. 10 is a flow diagram of a process for operating the closed loop system of FIG. 9.

FIG. 10 depicts a flow diagram for a process 1000 that determines the voltages to be supplied to the electrodes in the print zone to address overlay graininess and other image quality issues. In the discussion below, a reference to the process 1000 performing a function or action refers to the operation of a controller, such as controller 80', to execute stored program instructions to perform the function or action in association with other components in the printer. The process 1000 is described as being performed with the printer 10' of FIG. 1 for illustrative purposes.

The process 1000 begins with the controller 80' receiving from optical sensor 84 image data of an ink image, such as a test pattern, that has been printed on media 708 (block 1004). When the ink image is a test pattern, the media 708 is the same type of media that is to be printed in the upcoming print job and the test pattern is configured to enable the controller 80' to measure appropriate IQ metrics, such as drop spread of different colors on the media type and inter-color bleed between different colors. The controller 80' measures these IQ metrics (block 1008) and compares the measurements to their corresponding range of tolerance values for the IQ metrics (block 1012). For those measurements outside of their corresponding ranges, the controller 80' adjusts the voltage level supplied to the electrodes or electrode pairs corresponding to the printhead assembly that ejected the ink drops that resulted in IQ metrics that were outside their corresponding ranges (block 1016). Another ink image is printed or the test pattern is printed again (block 1020) and the metrics are measured again from the image data and compared to the tolerance ranges for the IQ metrics (blocks 1004, 1008, and 1012). The voltages continue to be adjusted (block 1016), the test pattern or another ink image printed (block 1020), and the metrics remeasured and compared to the corresponding tolerance ranges (blocks 1008-1012) until the metrics are within a predetermined tolerance range (block 1012). The print job is then commenced or continued with the electrode voltages at the levels determined by this process (block 1020).

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A color inkjet printer comprising:

at least one printhead having a nozzle plate with a plurality of nozzles in the nozzle plate, the plurality of nozzles being configured to eject liquid ink drops;

a media transport having a belt configured to carry media past the at least one printhead in a process direction to receive the liquid ink drops ejected by the at least one printhead;

a platen made of a high dielectric constant material, the platen being positioned opposite the media transport;

at least one electrical voltage source; and a plurality of electrodes embedded in the platen, the electrodes being configured to emit an electric field into a gap between the at least one printhead and the media transport without the electric field reaching the nozzle plate, the electric field being emitted from the plurality of electrodes in response to the at least one electrical voltage source being operatively connected to the electrodes.

2. The printer of claim 1 wherein the belt of the media transport is interposed between the platen and the at least one printhead, the belt having a conductivity determined by $\gamma=K_{\varepsilon 0}/s$, where $\gamma$ is the conductivity of the belt, K is a dielectric constant of the belt, $_{\varepsilon 0}$ is permittivity of free space, U is a speed of the belt as the belt moves past the at least one printhead, and s is a spacing between adjacent electrodes in the plurality of electrodes and the conductivity of the belt is in a range of about $10^{-5}$ to about $10^{-7}$ $(\text{ohm-m})^{-1}$.

3. The printer of claim 2 wherein at least two of the electrodes in the plurality of electrodes are oriented in the process direction and at least two more electrodes in the plurality of electrodes are oriented in a cross-process direction, the at least two electrodes oriented in the process direction are separated from one another by a first distance and the at least two electrodes oriented in the cross-process direction are separated from one another by the first distance.

4. The printer of claim 3 further comprising:

a positive voltage source, the positive voltage source being connected to one of the at least two electrodes oriented in the process direction and to one of the at least two electrodes oriented in the cross-process direction; and a negative voltage source, the negative voltage source being connected to another one of the at least two electrodes oriented in the process direction and to another one of the at least two electrodes oriented in the cross-process direction.

5. The printer of claim 4 further comprising:

an optical sensor configured to generate image data of ink images printed on media substrates after the media substrates have passed the at least one printhead; and a controller operatively connected to the optical sensor and to each electrical voltage source in the plurality of electrical voltage sources, the controller being further configured to measure an image quality (IQ) metric using the image data generated by the optical sensor and to adjust a voltage level of the positive voltage source and to adjust a voltage level of the negative voltage source using at least one measured IQ metric.

6. The printer of claim 5 wherein the at least one IQ metric is one of an ink drop spread and inter-color bleed.

7. The printer of claim 5 wherein the at least one IQ metric is a plurality of measured IQ metrics that include ink drop spread and inter-color bleed.

8. The printer of claim 2 wherein less than all of the electrodes in the plurality of electrodes are oriented in a process direction and a remaining number of electrodes in the plurality of electrodes are oriented in a cross-process direction, the electrodes oriented in the process direction are separated from one another by a first distance and the electrodes oriented in the cross-process direction are separated from one another by the first distance.

9. The printer of claim 8 further comprising:

a positive voltage source, the positive voltage source being connected to every other one of the electrodes oriented in the process direction and to every other one of the electrodes oriented in the cross-process direction; and a negative voltage source, the negative voltage source being connected to the electrodes oriented in the process direction that are not connected to the positive voltage source and to the electrodes oriented in the cross-process direction that are not connected to the positive voltage source.

10. The printer of claim 9 wherein the first distance is less than a distance between the nozzle plate of the at least one printhead and an upper surface of media carried by the belt of the media transport.

11. The printer of claim 10 wherein the electrodes are planar members and the planar member electrodes oriented in the process direction have a width in the range of about 25 to about 50 microns and the planar member electrodes oriented in the cross-process direction have a width in the range of about 25 to about 50 microns and the first distance is in a range of about 25 to about 50 microns when the printheads in the plurality of printheads have a resolution of 1200 dpi that eject ink drops having volumes in the about 3 to about 6 picoliters.

12. The printer of claim 9 further comprising:

an optical sensor configured to generate image data of ink images printed on media substrates after the media substrates have passed the at least one printhead; and a controller operatively connected to the optical sensor and to each electrical voltage source in the plurality of electrical voltage sources, the controller being further configured to measure an image quality (IQ) metric using the image data generated by the optical sensor and to adjust a voltage level of the positive voltage source and to adjust a voltage level of the negative voltage source using at least one measured IQ metric.

13. The printer of claim 12 wherein the at least one IQ metric is one of an ink drop spread and inter-color bleed.

14. The printer of claim 12 wherein the at least one IQ metric is a plurality of measured IQ metrics that include ink drop spread and inter-color bleed.

15. The printer of claim 1 wherein the high dielectric constant material has a dielectric constant of 10 or greater.

16. The printer of claim 15 wherein the high dielectric constant material has a dielectric breakdown strength of 20V/micron.

17. The printer of claim 16 wherein the high dielectric constant material is one of silicon nitride, titanium dioxide, strontium titanate, barium strontium titanate, and barium titanate.

* * * * *